United States Patent [19]
Oxaal

[11] Patent Number: 5,903,782
[45] Date of Patent: May 11, 1999

[54] METHOD AND APPARATUS FOR PRODUCING A THREE-HUNDRED AND SIXTY DEGREE SPHERICAL VISUAL DATA SET

[76] Inventor: Ford Oxaal, 212 3rd St., No. 3-D, Troy, N.Y. 12180

[21] Appl. No.: 08/749,166

[22] Filed: Nov. 14, 1996

Related U.S. Application Data

[60] Provisional application No. 60/006,800, Nov. 15, 1995.
[51] Int. Cl.$^6$ .................................................. G03B 29/00
[52] U.S. Cl. .............................. 396/50; 396/428; 396/20
[58] Field of Search .............................. 396/50, 428, 20, 396/427

[56] References Cited

U.S. PATENT DOCUMENTS

| | | | |
|---|---|---|---|
| 1,730,346 | 10/1929 | Beeson et al. | 396/428 |
| 3,183,810 | 5/1965 | Campbell et al. | 396/20 |
| 4,591,250 | 5/1986 | Woodruff | 396/50 |
| 5,159,368 | 10/1992 | Zemlin | 396/427 |
| 5,185,667 | 2/1993 | Zimmermann . | |
| 5,200,818 | 4/1993 | Neta et al. . | |
| 5,259,584 | 11/1993 | Wainwright | 396/20 |
| 5,313,306 | 5/1994 | Kuban et al. . | |
| 5,359,363 | 10/1994 | Kuban et al. . | |
| 5,384,588 | 1/1995 | Martin et al. . | |

OTHER PUBLICATIONS

Photosphere Omniview Document, Nov. 2, 1995, pp. 1–3.
Apple Quick Time VR Document, Nov. 28, 1995.
Frequently Asked Questions About Photospheres, Omniview Inc,http://www.usit.net/hp/omniview/faq.htm, pp. 1–3, Nov. 2, 1995.

*Primary Examiner*—David M. Gray
*Attorney, Agent, or Firm*—Westerlund & Powell, P.C.; Raymond H.J. Powell, Jr.; Robert A. Westerlund

[57] ABSTRACT

The present invention is directed to an apparatus and method for producing a three-hundred and sixty degree spherical visual data set using at least one lens. The lens encompasses a field of view of not less than one-hundred and eighty degrees. The field of view is represented by a hemisphere defined by a half-space which is, in turn, defined by a first plane having an origin point through which a vertical axis of the plane extends. The apparatus includes a mounting support member and a plumbing device. The mounting support member positions at least one camera having the at least one lens. The mounting support member is aligned with the vertical axis and rotatable in first and second directions through at least one-hundred and eighty degrees from a first position to a second position. The plumbing device is mounted to one of the camera, lens and mounting means and maintains the vertical axis plumb.

6 Claims, 4 Drawing Sheets

METHOD AND APPARATUS FOR PRODUCING A THREE-HUNDRED AND SIXTY DEGREE SPHERICAL VISUAL DATA SET

This application claims benefit of use Provisional Appl. No. 60/006,800 filed Nov. 15, 1995.

BACKGROUND OF THE INVENTION

1. Field of the Invention

The present invention relates generally to the field of photography. More specifically, the present invention is directed to an apparatus and method for producing a three-hundred and sixty degree spherical visual data set in order to facilitate the production of computer generated images.

2. Brief Discussion of the Related Art

In the field of photography, cameras are often fitted with a variety of wide angle lenses so that still photographs of panoramic views can be taken. In addition, digital image processing has made possible the creation of computer generated images of panoramic views from multiple digital images which are, in turn, derived from pictures taken using cameras fitted with conventional lenses.

Each computer generated image is created by digitally stitching the multiple digital images together using software. However, it is difficult to create a seamless computer image from digital images which are derived from analog-based pictures taken using conventional photography techniques. The reason stems from the fact that it is hard to properly align the camera which is used to take those pictures.

Early attempts at digital image processing have produced computer generated images of panoramic views which are cylindrical in nature. In other words, the computer images generated using conventional digital image processing techniques do not provide any views which are either above or below the camera that produced the original analog based pictures from which the digital images are derived.

With the advent of new digital image processing techniques, software has been developed which allows for the transformation of 360 degrees of visual input data in accordance with a particular perspective. The inventor of the present invention recognized a need for devices and methods of taking pictures which capture 360 degrees of spherical visual input data in order to take advantage of the newly developed digital image processing techniques which have been implemented in software. By way of example, one such software algorithm is described in U.S. application Ser. No. 08/478,839, filed on Jun. 7, 1995 by the inventor of the present invention.

SUMMARY OF THE INVENTION

In view of the foregoing, it is an object of the present invention to provide a method and apparatus for producing a three hundred and sixty degree spherical visual data set in order to provide the input for software algorithms which transform visual input data in accordance with a particular perspective.

According to one embodiment of the present invention, an apparatus is provided for producing a three-hundred and sixty degree spherical visual data set using at least one lens which encompasses a field of view of not less than one-hundred and eighty degrees, the field of view being represented by a hemisphere defined by a half-space which is, in turn, defined by a first plane having an origin point through which a vertical axis of the plane extends.

The apparatus includes a mounting support member which positions at least one camera having the at least one lens, the mounting support member being aligned with the vertical axis and being rotatable in first and second directions through at least one-hundred and eighty degrees from a first position to a second position, and a plumbing device which is mounted to one of the camera, lens, and mounting support member and which maintains the vertical axis plumb with respect to a predetermined plane of reference. Preferably, the camera is positioned so that no part of the camera, other than the lens, is positioned within the half-space.

According to the present invention, the method of producing a three hundred and sixty degree spherical visual data set uses at least one lens of a camera which encompasses a field of view of not less than one-hundred and eighty degrees. The field of view is represented by a hemisphere defined by a half-space which is in turn defined by a first plane having an origin point through which a vertical axis of the first plane extends. The method comprises the steps of getting the vertical axis plumb with respect to a predetermined plane of reference and maintaining the plumbness of the vertical axis with respect to the predetermined plane of reference. The method also includes the steps of aligning the lens with the first plane and pivoting the lens one-hundred and eighty degrees around the vertical axis. Thereafter, the first four steps are repeated.

BRIEF DESCRIPTION OF THE DRAWINGS

These and other features, aspects and advantages of the present invention will become better understood with reference to the following description, appended claims and accompanying drawings, in which:

DETAILED DESCRIPTION OF THE INVENTION

The present invention is directed to an apparatus and method for producing a three-hundred and sixty degree spherical visual data set using a camera fitted with a lens having a particular field of view.

Figure 1:
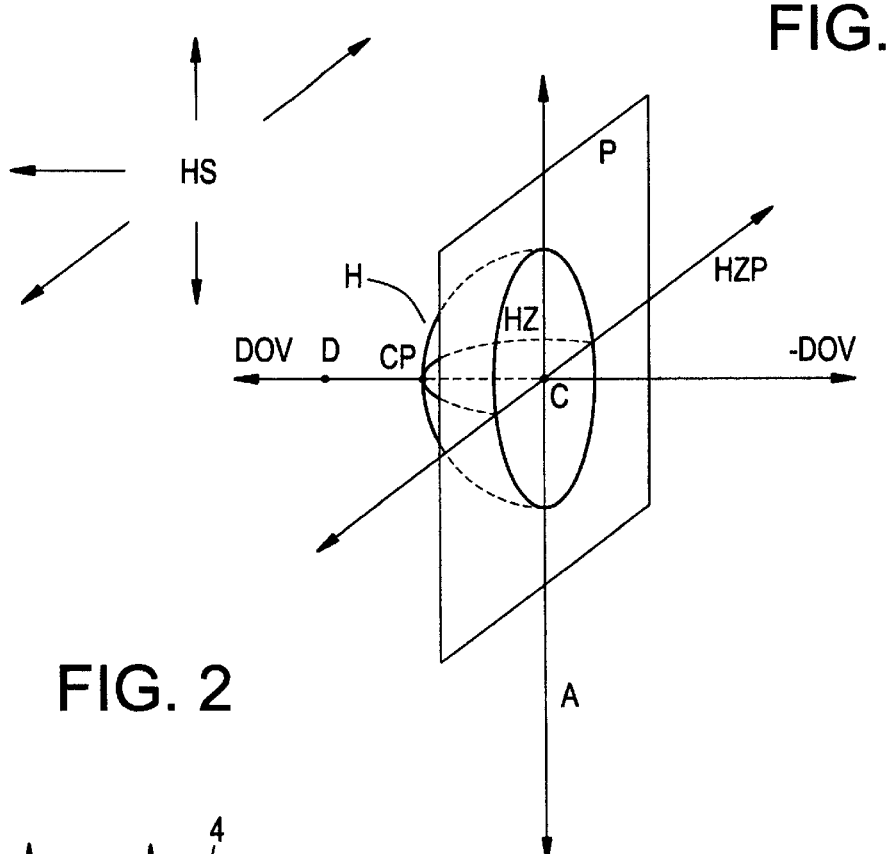
FIG. 1 depicts the field of interest within a field of view of a lens used in conjunction with a present embodiment of the invention.

FIG. 1 depicts a field of interest within a field of view of a lens used in an embodiment of the present invention. The field of interest is some designated 90 degree radius (180 degree) portion of the lens' field of view. This 180 degree portion may be represented as a hemisphere (H) defined by a half-space (HS), which is, in turn, defined by a plane (P). A center point (CP) is designated as the point on the hemisphere furthest from the plane (P).

The direction of vision (DOV) is a ray extending from a point (C) in the plane (P) through the center point (CP), point (C) also being the center of the hemisphere (H). Another ray (−DOV) extends from the point (C) in the opposite direction as the ray (DOV). A horizon (HZ) is a circle on the hemisphere (H) that intersects with the center point (CP). A vertical axis (A) is the line on the plane (P) which is perpendicular to an orthogonal projection (HZP) of horizon (HZ) which is also in the vertical plane (P).

Figure 2:
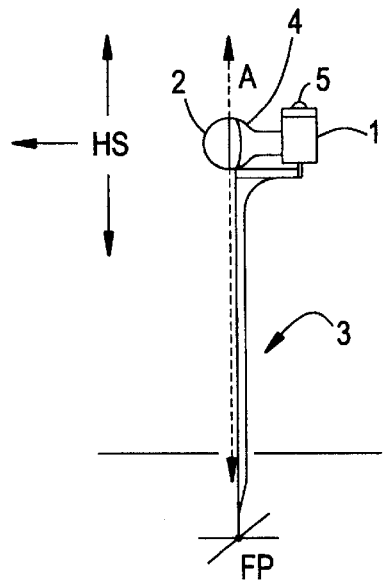
FIG. 2 depicts one embodiment of the present invention which uses a monopod as a mounting support member for a camera having a lens.

FIG. 2 depicts an exemplary apparatus for providing a three-hundred and sixty-degree spherical visual data set according to one embodiment of the present invention. The apparatus supports a camera (1) having a lens (2). The camera (1) is mounted on a monopod (3) which is aligned with the vertical axis (A). However, numerous other mounting support members may be employed, such as the tripod described in connection with FIG. 3 below.

The monopod (3) is placed on the ground at a foot point (FP) on the vertical axis (A). The foot point (FP) is a point in a predetermined plane of reference which may be the ground. Preferably, the camera (1) and its associated lens (2) are mounted on the monopod (3) such that neither the camera (1) nor the lens casing (4) are within the half-space (HS). Although a bubble level (5) is placed on the camera, one of ordinary skill will appreciate that the bubble level (5) may be mounted on the monopod (3) instead.

The bubble level (5) should be mounted so that when it is level, the vertical axis (A) will be plumb with respect to the predetermined plane of reference. The plumbness of the vertical axis (A) should be maintained with respect to the predetermined plane of reference and the lens (2) aligned azimuth-wise in the plane (P) described above in connection with FIG. 1. Preferably, a fixed light source is also aligned in the plane (P). A first picture is then taken. Subsequently, the apparatus is pivoted one-hundred and eighty degrees around the vertical axis while maintaining the foot point (FP) in the same position in preparation for the taking of an additional picture.

Another plumbing device may be employed in lieu of the bubble device. By way of example, the bubble level may be replaced with two tube levels which are positioned at right angles to one another.

Figure 3:
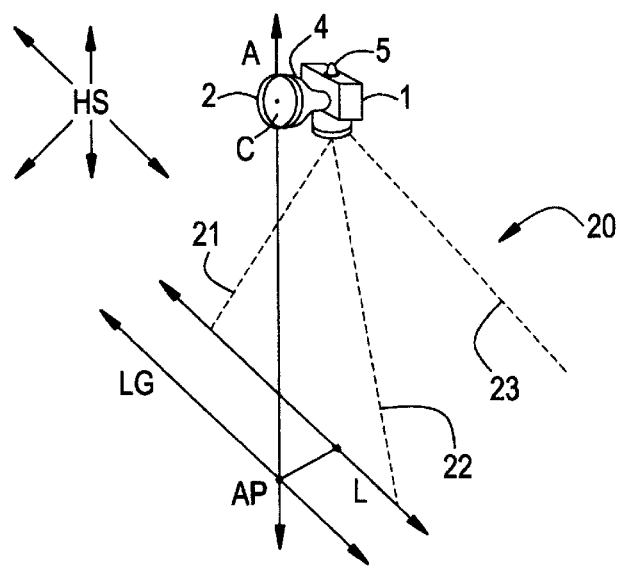
FIG. 3 depicts another embodiment of the present invention which uses a tripod as a mounting support member for a camera having a lens.

If the camera and its associated lens are too heavy to put on a monopod, then a tripod can be employed as the mounting support member. A tripod is especially advantageous in time lapse photography or motion picture photography. An embodiment of the present invention employing a tripod is shown in FIG. 3. Elements depicted in FIG. 3 which are similar to those shown in FIG. 2 retain their same identifier. These elements include the camera (1), lens (2), lens casing (4), and bubble level (5).

The tripod (20) is adjusted so that its two front legs (21) and (22) form a plane roughly parallel to the vertical axis (A). The third leg (23) can be extended or retracted to achieve this objective. The line (L) connects the feet of the front legs (21) and (22) which are adjusted so that the line (L) is parallel to the plane (P). In this configuration, the tripod forms roughly a right-angled three-sided prism. Preferably, no part of the tripod is within the half-space (HS). Point (AP) where axis (A) intersects the ground is determined using a plumb line dropped from the point (C) to the ground. The point (AP) corresponds to the point (FP) depicted in FIG. 2.

Figure 4A:
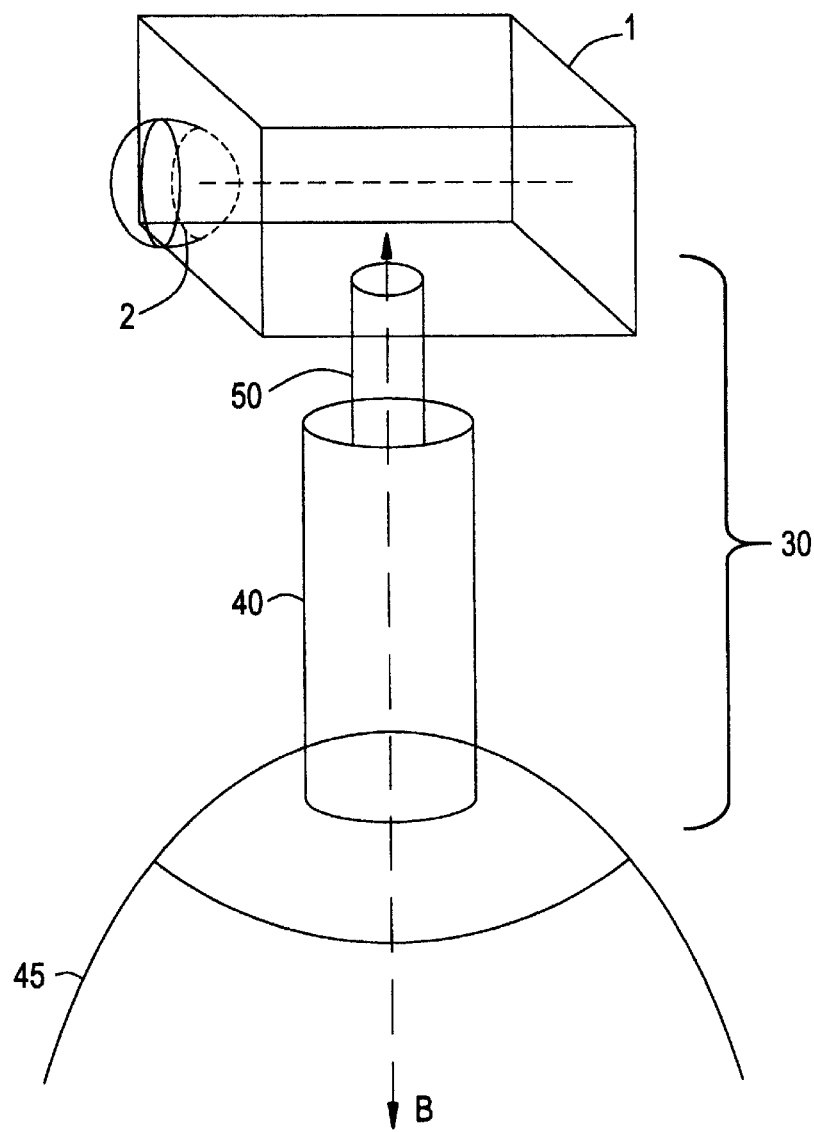
FIGS. 4A–4C depict features of a mounting component which is employed in an embodiment of the present invention.
Figure 4B:
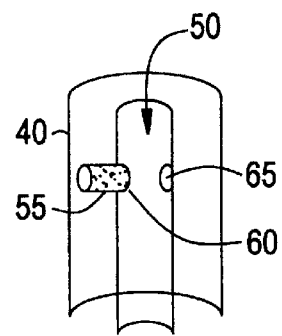
Figure 4C:
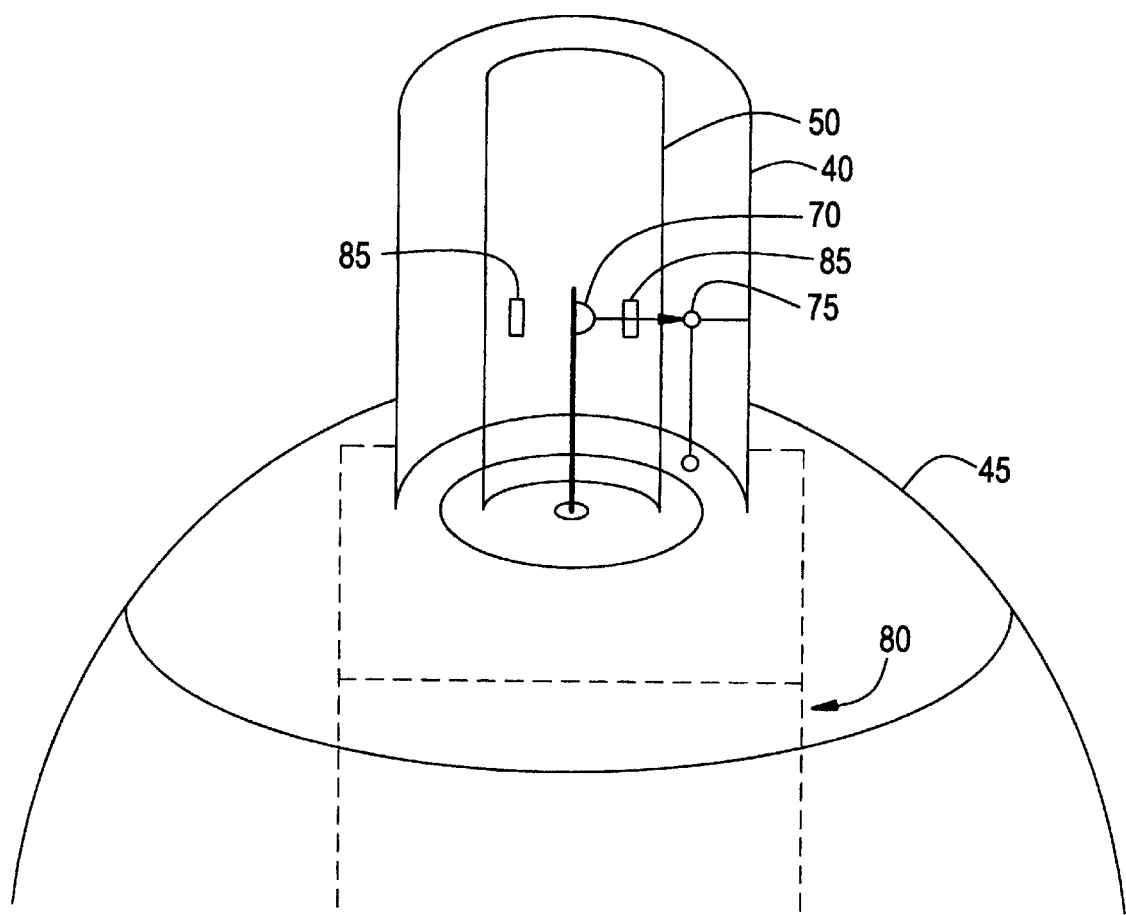

Further refinements are possible with respect to the above-described embodiments of the present invention. Specifically, an apparatus according to the present invention may also include a mounting component (30), as shown in FIGS. 4A, 4B and 4C. Elements which are similar to those shown in FIG. 1 retain their same identifier. These elements include the camera (1) and the lens (2). The mounting component (30) includes an outer sleeve (40) which is detachably connected to the mounting support member (45). The mounting component (30) also includes an inner cylinder (50) which is detachably connected to the camera (1). The inner cylinder (50) rotates inside the outer sleeve (40) around axis (B) and clicks into place in a first direction (D) or a second opposite direction (−D) through the use of a spring-loaded pin (55) which is included in the outer sleeve (40), as shown in FIG. 4B.

The spring-loaded pin (55) forms a tight fit with either of two rounded notches (60 and 65) on opposite sides of the inner cylinder (50). The mounting component (30) can be adjusted so that the axis (A) of the field of interest of the lens (2) can be aligned with axis (B) when the camera (1) is attached to the mounting support member (45) via the mounting component (30).

As a further refinement, the mounting component (30) can be fitted with an LED (70) and optical sensor (75) instead of the spring-loaded pin (55), as shown in FIG. 4C. In this regard, the rotation of the inner cylinder (50) of the mounting component (30) can be electro-mechanically controlled via an electro-mechanical controller (80) in response to the detection of a light beam from the LED (70) or alternative light source by the optical sensor (75). The electro-mechanical controller (80) is positioned beneath the surface of the mounting support member (45) and is operatively connected to the inner cylinder (50) to control the rotation thereof. However, the electro-mechanical controller (80) need not be positioned beneath the surface of the mounting support member (45).

More specifically, the light beam, which is produced by the LED (70) disposed within the inner cylinder (50) of the mounting component (30), can be detected by the optical sensor (75), which is disposed on the outer sleeve (40) of the mounting component (30), through a slit (85) in the inner cylinder (30). However, those of ordinary skill in the art will appreciate that the LED (70) could be disposed on the outer sleeve (40) of the mounting component, while the optical sensor (75) is disposed within the inner cylinder (50) of the mounting component (30).

The camera (1) which is detachably connected to the inner cylinder (50) rotates in accordance with the rotation of the inner cylinder (50) so that the camera (1) can be made to take a picture in one direction (DOV) and then in an opposite direction (−DOV).

An additional refinement to the apparatus can be had by utilizing a mounting support member which is capable of supporting two cameras and two opposing lenses, the lenses being aligned so that point (CP) for each lens faces in opposite directions. However, parallax problems may result from the use of two cameras to the extent that each lens is prevented from being physically located so that the respective focal points of the lenses are identical. In this regard, the size of the cameras and the lens casings are important considerations because of the parallax problems which may arise from their combined use.

Advantageously, the apparatus can also be provided with a registering means for registering ray (DOV) or ray (−DOV). However, the registering means may register a predetermined reference ray other than ray (DOV) or ray (−DOV). By way of example, the registering means may be comprised of finder scopes, or a combination of laser reflection and photoelectric elements. Alternatively, the registering means may include a gyroscopic element.

The mounting support member can also include a gimbal mount which fits around a circular lens casing. However, the gimbal mount's axis should be made coincident with line (HZP) shown in FIG. 1 and the legs should be positioned so that they are coincident with plane (P), which is also shown in FIG. 1.

Advantageously, the mounting support member can be made of transparent and non-reflective materials in order to reduce the chance that the picture will be corrupted by the presence of the mounting support member in the resulting picture.

Figure 5:
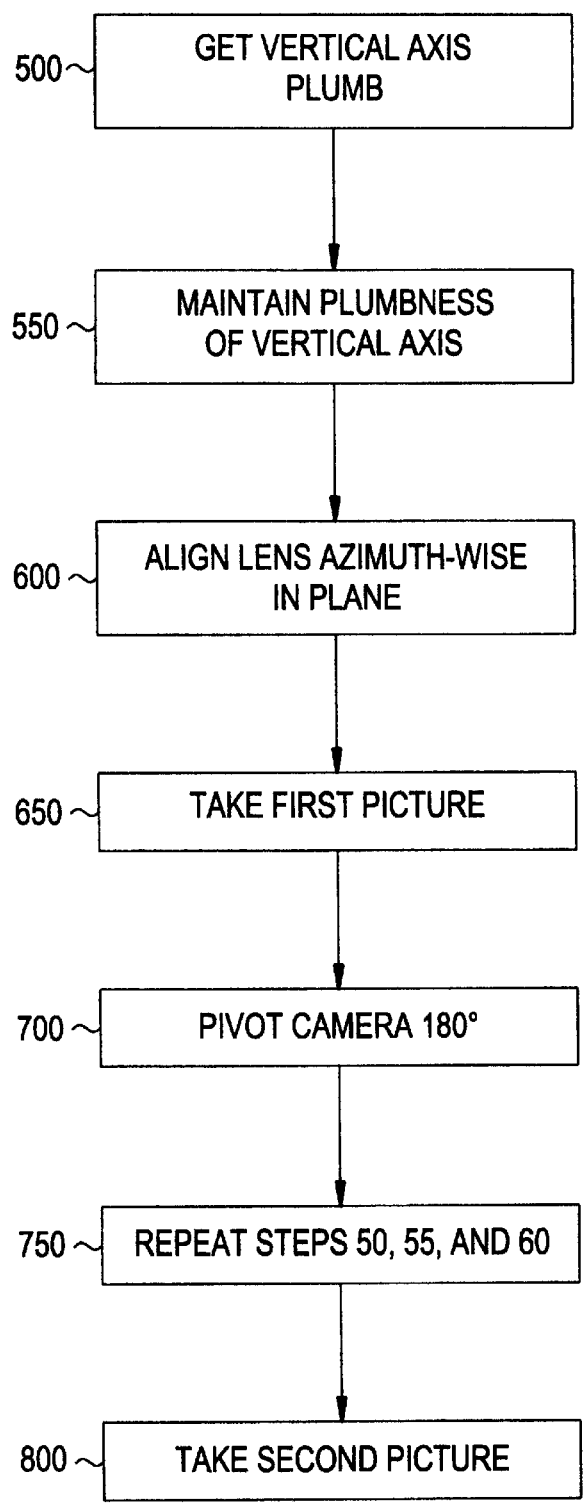
FIG. 5 depicts a flow chart which shows the steps of a method according to one aspect of the present invention.

A method of producing a 360 degree spherical visual input data set is also provided in accordance with the present invention. The method is described with reference to the lens having the field of view shown in FIG. 1. However, the flow chart depicted in FIG. 5 identifies the steps of the method.

According to the present invention, the method includes the step 500 of getting the vertical axis (A) plumb with respect to a predetermined plane of reference which may be the ground. This step 500 can be accomplished using a plumbing device such as the bubble level described above or a conventional plumb line. The method also includes the step 550 of maintaining the plumbness of the vertical axis (A) with respect to the predetermined plane of reference and the step 600 of aligning the lens azimuth-wise in the plane (P). Preferably, a fixed light source is also aligned in plane (P) in order to provide adequate lighting for the taking of the picture.

In addition, the method also includes the step 650 of taking a first picture using the camera and the step 700 of pivoting the camera 180 degrees around the axis (A). By way of example, if a monopod is being used as the mounting support member for the camera and its associated lens, as shown in FIG. 2, the monopod is rotated 180 degrees while keeping the foot print (FP) the same.

However, if a tripod is used as the mounting support member instead of the monopod, as shown in FIG. 3, then a line (LG) is first delineated on the ground (or an alternate predetermined plane of reference) representing the intersection of plane (P) with the ground. The line (LG) also passes through the point (AP), as discussed above in connection with FIG. 3. The tripod is then adjusted so that its front two legs form rest on a line (L) which is roughly parallel to the line (LG).

The remaining leg is then adjusted until the plumbing device indicates that the vertical axis (A) is plumb. The first picture is then taken using the camera. Subsequently, the entire apparatus is rotated 180 degrees. The proper alignment of the apparatus is confirmed by determining whether the front two feet of the tripod again form a line which is parallel to the line (LG) and by determining whether point (C) forms a line which is plumb and which contains the point (AP).

Following the pivoting of the camera and its associated lens, steps 500, 550 and 600 are repeated in step 750. Finally, in step 800 a second picture is taken to complete the acquisition of three-hundred and sixty degrees of spherical visual data.

Although the preferred embodiments of the present invention have been described, the spirit and scope of the invention is by no means restricted to what is described above. For example, a digital camera may be employed avoiding the necessity of converting analog based pictures into digital format to facilitate the production of computer generated images using software algorithms which transforms three-hundred and sixty degree spherical visual input data in accordance with a particular perspective.

What is claimed is:

1. A method for producing a three-hundred and sixty degree visual data set using at least one lens of a camera which encompasses a field of view of not less than one-hundred and eighty degrees, said field of view being represented by a hemisphere having a base which defines at least a half-space which is in turn defined by a first plane having an origin point through which a vertical axis of said first plane extends, said first plane coinciding with said base of said hemisphere and said origin point coinciding with a center of said hemisphere, said method comprising the steps of:

(i) getting said vertical axis plumb with respect to a first predetermined plane of reference;

(ii) maintaining the plumbness of said vertical axis with respect to the first predetermined plane of reference;

(iii) aligning the lens such that said first plane corresponds to a second predetermined plane of interest;

(iv) shooting a picture using said camera;

(v) pivoting the lens substantially one-hundred and eighty degrees around the vertical axis; and (vi) repeating steps (i) through (iv).

2. The method as recited in claim 1, further comprising the step of aligning a fixed light source with said first plane after the step of aligning the lens.

3. The method as recited in claim 1, wherein a monopod is used to support the lens.

4. A method for producing a three-hundred and sixty degree visual data set using at least one lens of a camera which encompasses a field of view of not less than one-hundred and eighty degrees, said field of view being represented by a hemisphere having a base which defines at least a half-space which is in turn defined by a first plane having an origin point through which a vertical axis of said first plane extends, said first plane coinciding with said base of said hemisphere and said origin point coinciding with a center of said hemisphere, wherein a tripod is used to support the lens, said method comprising the steps of:

(i) getting said vertical axis plumb with respect to a first predetermined plane of reference, wherein the step of getting said vertical axis plumb further comprises the steps of:
    delineating a first line on the ground representing an intersection of said first plane with the ground;
    placing a first leg and a second leg of said tripod on a second line parallel to said first line; and
    adjusting a third leg of said tripod such that the vertical axis is plumb with said predetermined plane of reference;

(ii) maintaining the plumbness of said vertical axis with respect to the first predetermined plane of reference;

(iii) aligning the lens such that said first plane corresponds to a second predetermined plane of interest;

(iv) shooting a picture using said camera;

(v) pivoting the lens substantially one-hundred and eighty degrees around the vertical axis; and (vi) repeating steps (i) through (iv).

5. The method as recited in claim 4, wherein the step of pivoting the lens further comprises the step of:

pivoting said tripod one-hundred and eighty degrees so that the first and second legs are placed on a third line parallel to said first line.

6. A method for producing a three-hundred and sixty degree visual data set using at least one lens of a camera supported by a tripod which encompasses a field of view of not less than one-hundred and eighty degrees, said field of view being represented by a hemisphere having a base which defines at least a half-space which is in turn defined by a first plane having an origin point through which a vertical axis of said first plane extends, said first plane coinciding with said base of said hemisphere and said origin point coinciding with a center of said hemisphere, said method comprising the steps of:

(i) getting said vertical axis plumb with respect to a first predetermined plane of reference, said step (i) further comprising steps for:
    delineating a first line on the ground representing an intersection of said first plane with the ground;
    placing a first leg and a second leg of said tripod on a second line parallel to said first line; and
    adjusting a third leg of said tripod such that the vertical axis is plumb with said predetermined plane of reference;

(ii) maintaining the plumbness of said vertical axis with respect to the first predetermined plane of reference;
  (iii) aligning the lens such that said first plane corresponds to a second predetermined plane of interest;
  (iv) aligning a fixed light source with said first plane;
  (v) shooting a picture using said camera;
  (vi) pivoting the lens substantially one-hundred and eighty degrees around the vertical axis;
  (vii) pivoting said tripod one-hundred and eighty degrees so that the first and second legs are placed on a third line parallel to said first line; and
  (vii) repeating steps (i) through (iv), wherein:
  said steps (iii) and (iv) are performed in the stated order, and
  said steps (vi) and (vii) are performed in any order.

* * * * *